US012503333B2

(12) United States Patent
Appana, Jr.

(10) Patent No.: US 12,503,333 B2
(45) Date of Patent: Dec. 23, 2025

(54) SYSTEMS AND METHODS FOR DISPATCHING ELEVATORS

(71) Applicant: Appana Industries LLC, Jamaica, NY (US)

(72) Inventor: Amarnauth Appana, Jr., Jamaica, NY (US)

(73) Assignee: Appana Industries LLC, Jamaica, NY (US)

( * ) Notice: Subject to any disclaimer, the term of this patent is extended or adjusted under 35 U.S.C. 154(b) by 1123 days.

(21) Appl. No.: 17/486,502

(22) Filed: Sep. 27, 2021

(65) Prior Publication Data

US 2022/0098003 A1 Mar. 31, 2022

Related U.S. Application Data

(60) Provisional application No. 63/084,452, filed on Sep. 28, 2020.

(51) Int. Cl.
*B66B 1/24* (2006.01)
*B66B 1/34* (2006.01)
(Continued)

(52) U.S. Cl.
CPC .......... *B66B 1/2458* (2013.01); *B66B 1/3476* (2013.01); *B66B 5/0012* (2013.01);
(Continued)

(58) Field of Classification Search
CPC ... B66B 1/2458; B66B 1/3476; B66B 5/0012; B66B 5/0018; B66B 1/3492;
(Continued)

(56) References Cited

U.S. PATENT DOCUMENTS 3,851,733 A 12/1974 Sackin et al.
5,271,484 A 12/1993 Bahjat et al.
(Continued)

FOREIGN PATENT DOCUMENTS

CN 102112382 A 6/2011
CN 102976170 A 3/2013
(Continued)

OTHER PUBLICATIONS

Japanese Notice of Allowance issued on Jun. 6, 2023, in counterpart Japanese Patent Application No. 2021-155324 (6 pages).
(Continued)

*Primary Examiner* — Jeffrey Donels
(74) *Attorney, Agent, or Firm* — Bookoff McAndrews, PLLC

(57) ABSTRACT

A method for dispatching an elevator car that includes determining a first duration for each of a plurality of first elevator cars to travel from a current location to a first location, and dispatching at least one of the first elevator cars to the first location when the first duration of the at least one first elevator car is less than a threshold duration. The method includes determining a second duration for an occupant to travel from the first location to a second location, and each of a plurality of second elevator cars to travel from the current location to the second location, when the first duration for the first elevator cars exceeds the threshold duration. The method includes dispatching at least one of the second elevator cars to the second location when the second duration of the at least one second elevator car is less than the threshold duration.

20 Claims, 4 Drawing Sheets

300

(51) Int. Cl.
*B66B 1/46* (2006.01)
*B66B 5/00* (2006.01)

(52) U.S. Cl.
CPC .......... *B66B 5/0018* (2013.01); *B66B 1/3492* (2013.01); *B66B 1/468* (2013.01); *B66B 2201/212* (2013.01); *B66B 2201/222* (2013.01); *B66B 2201/23* (2013.01)

(58) Field of Classification Search
CPC .............. B66B 1/468; B66B 2201/212; B66B 2201/222; B66B 2201/23
See application file for complete search history.

(56) References Cited

U.S. PATENT DOCUMENTS

| | | | | |
|---|---|---|---|---|
| 9,896,303 | B2 * | 2/2018 | Freeman | B66B 1/2458 |
| 2012/0118677 | A1 | 5/2012 | Finschi | |
| 2015/0203327 | A1 | 7/2015 | Appana, Jr. | |
| 2016/0167920 | A1 | 6/2016 | Freeman et al. | |
| 2017/0121147 | A1 | 5/2017 | Stranieri et al. | |
| 2020/0130992 | A1 * | 4/2020 | Simcik | B66B 1/2458 |
| 2022/0098003 | A1 * | 3/2022 | Appana, Jr. | B66B 5/0012 |

FOREIGN PATENT DOCUMENTS

| | | | | |
|---|---|---|---|---|
| CN | 103420233 | A | 12/2013 | |
| CN | 103663011 | A | 3/2014 | |
| CN | 107010496 | A | 8/2017 | |
| CN | 108975109 | A | 12/2018 | |
| CN | 111086931 | A | 5/2020 | |
| EP | 2261160 | A1 | 12/2010 | |
| EP | 2316771 | A1 | 5/2011 | |
| JP | 2004-51284 | A | 2/2004 | |
| JP | 2004224556 | A | 8/2004 | |
| WO | WO-2015109166 | A1 * | 7/2015 | B66B 1/2458 |

OTHER PUBLICATIONS

Extended European Search Report issued on Feb. 21, 2022, in counterpart European Patent Application No. 21198585.8 (10 pages, in English).
Japanese Office Action issued on Dec. 13, 2022, in counterpart Japanese Patent Application No. 2021-155324 (5 pages, with English translation).
Canadian Examination Report issued on Dec. 12, 2022, in counterpart Canadian Patent Application No. 3,130,986 (3 pages, in English).

* cited by examiner

SYSTEMS AND METHODS FOR DISPATCHING ELEVATORS

CROSS-REFERENCE TO RELATED APPLICATIONS

This application claims the benefit of priority from U.S. Provisional Application No. 63/084,452, filed on Sep. 28, 2020, which is incorporated by reference herein in its entirety.

TECHNICAL FIELD

Aspects of the present disclosure relate generally to systems and methods for controlling elevator traffic flow, and specifically to examples of elevator control systems that dispatch elevator cars based on a travel duration relative to a group of elevator cars.

DESCRIPTION OF RELATED TECHNOLOGY

Elevator systems may generally employ a dispatch methodology based on a necessary travel time to answer a call request. In such systems, an estimated travel time of each elevator car may be determined when a call request is received. An elevator car located near the call location, and having the smallest travel time to the call location, may be dispatched to a location of the call request. In some instances, an elevator car located at another location may have the smallest travel time, such that said elevator car may be dispatched to the call request. The prospective passenger initiating the call request may be instructed to travel to the other location for pick up.

However, assigning elevator cars that are located at distant locations (relative to where the call request originated from) may result in prospective passengers missing the elevator car upon their arrival to the location. This may be due to a duration required for the prospective passenger to travel to the location of the elevator car. As a result, prospective passengers may be required to attempt another call request for a separate elevator car, thereby resulting in decreased traffic flow and greater wait times. Providing a system capable of determining a travel duration between locations when assigning elevator cars may minimize instances of dispatching elevator cars that prospective passengers may not be capable of reaching, thereby increasing traffic flow and decreasing wait times for prospective passengers.

BRIEF DESCRIPTION OF DRAWINGS

The accompanying drawings, which are incorporated in and constitute a part of this disclosure, illustrate various exemplary embodiments and together with the description, serve to explain the principles of the disclosure.

Aspects of the disclosure may be implemented in connection with embodiments illustrated in the attached drawings. These drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure. There are many aspects and embodiments described herein. Those of ordinary skill in the art will readily recognize that the features of a particular aspect or embodiment may be used in conjunction with the features of any or all of the other aspects or embodiments described in this disclosure.

SUMMARY

Figure 1:
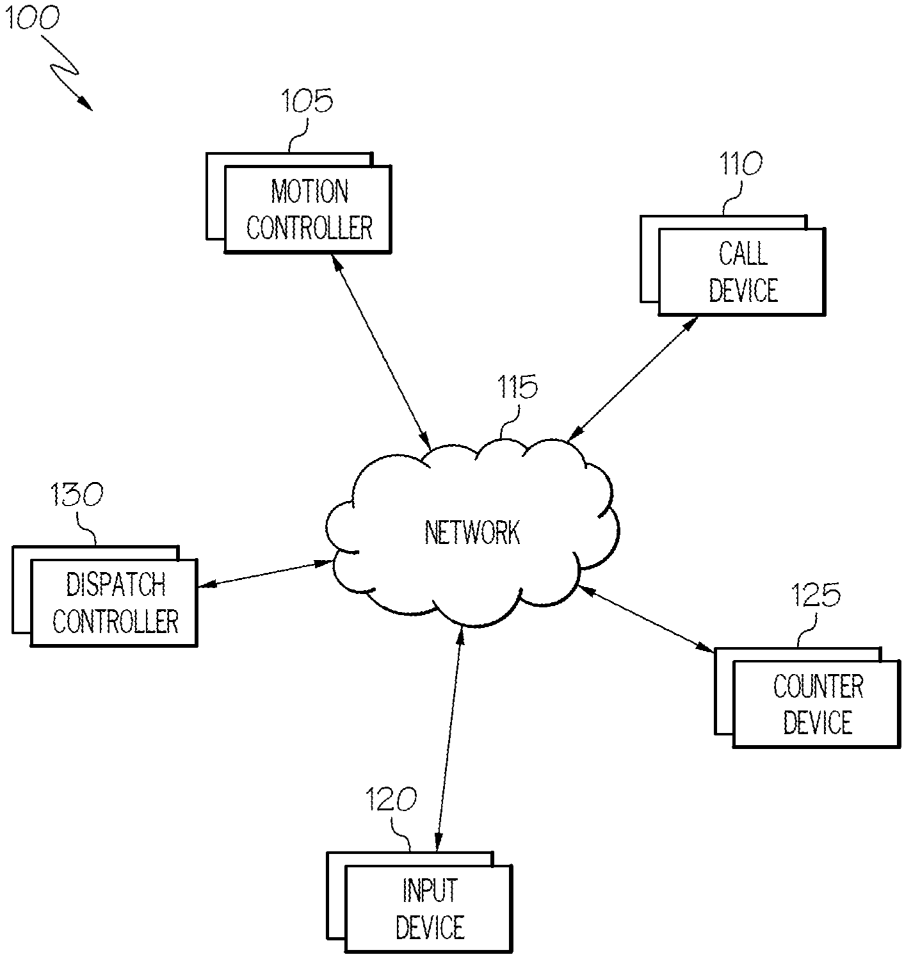
FIG. 1 depicts a dispatch system including one or more devices in communication over a network.

According to an example, a method for dispatching an elevator car includes determining a first duration for each of a plurality of first elevator cars to travel from a current location to a first location; dispatching at least one of the plurality of first elevator cars to the first location when the first duration of the at least one first elevator car is less than a threshold duration and the first duration of the remaining plurality of first elevator cars; determining a second duration for (i) an occupant to travel from the first location to a second location, and (ii) each of a plurality of second elevator cars to travel from the current location to the second location, when the first duration for each of the plurality of first elevator cars exceeds the threshold duration; and dispatching at least one of the plurality of second elevator cars to the second location when the second duration of the at least one second elevator car is less than the threshold duration and the second duration of the remaining plurality of second elevator cars.

According to another example, a system for dispatching an elevator car includes at least one motion controller operably coupled to a plurality of elevator cars, the at least one motion controller is configured to determine a current location of the plurality of elevator cars, wherein the plurality of elevator cars includes a first subset and a second subset; and a dispatch controller operably coupled to the at least one motion controller of the plurality of elevator cars, such that the dispatch controller receives data indicative of the current location of the plurality of elevator cars. The dispatch controller is configured to: determine a first duration for each of the first subset of elevator cars to travel from the current location to a first location; dispatch, in response to the first duration of at least one of the first subset of elevator cars not exceeding a threshold duration, the at least one elevator car of the first subset to the first location; determine, in response to the first duration for each of the first subset of elevator cars exceeding the threshold duration, a second duration for (i) an occupant to travel from the first location to a second location, and (ii) each of the second subset of elevator cars to travel from the current location to the second location; and dispatch, in response to the second duration of at least one of the second subset of elevator cars not exceeding the threshold duration, the at least one elevator car of the second subset to the second location.

According to a further example, a system for controlling traffic flow of a plurality of elevator cars, comprising a processor and a memory storing instructions that, when executed by the processor, causes the processor to perform operations including: determining a first duration for each of a plurality of first elevator cars to travel from a current location to a first location; dispatching at least one of the plurality of first elevator cars to the first location when the first duration of the at least one first elevator car is less than a threshold duration; determining a second duration for (i) an occupant to travel from the first location to a second location, and (ii) each of a plurality of second elevator cars to travel from the current location to the second location, when the first duration for each of the plurality of first elevator cars exceeds the threshold duration; and dispatching at least one of the plurality of second elevator cars to the second location when the second duration of the at least one second elevator car is less than the threshold duration.

DETAILED DESCRIPTION

The dispatch system of the present disclosure may be in the form of varying embodiments, some of which are depicted by the figures and further described below.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range+/−10%.

FIG. 1 shows an exemplary dispatch system 100 that may include motion controller 105, call device 110, input device 120, counter device 125, and dispatch controller 130. The one or more devices of dispatch system 100 may communicate with one another across a network 115 and in any arrangement. For example, the devices of dispatch system 100 may be communicatively coupled to one another via a wired connection, a wireless connection, or the like. In some embodiments, network 115 may be a wide area network ("WAN"), a local area network ("LAN"), personal area network ("PAN"), etc. Network 115 may further include the Internet such that information and/or data provided between the devices of dispatch system 100 may occur online (e.g., from a location remote from other devices or networks coupled to the Internet). In other embodiments, network 115 may utilize Bluetooth® technology and/or radio waves frequencies.

Motion controller 105 may be operably coupled to a transportation unit and configured to detect and transmit motion data of the transportation unit to one or more devices of dispatch system 100, such as, for example, dispatch controller 130. For example, motion controller 105 may measure and record one or more parameters (e.g., motion data) of the transportation unit, including, but not limited to, a current location, a travel direction, a travel speed, a door location, a status, and more. Motion controller 105 may include a computing device having one or more hardware components (e.g., a processor, a memory, a sensor, a communications module, etc.) for generating, storing, and transmitting the motion data. As described in further detail herein, motion controller 105 may be operably coupled to an elevator car located within a building and dispatch system 100 may include at least one motion controller 105 for each elevator car.

Still referring to FIG. 1, call device 110 may be positioned outside the transportation unit and configured to receive a user input from one or more prospective occupants for accessing the transportation unit. For example, the user input may be indicative of a call requesting transportation from the transportation unit. Call device 110 may be configured to transmit the call request to one or more devices of dispatch system 100, such as, for example, dispatch controller 130. Call device 110 may include a keypad, a touchscreen display, a microphone, a button, a switch, etc. Call device 110 may be further configured to receive a user input indicative of a current location of the call request (e.g., a first location) and/or a destination location from a plurality of locations.

As described in further detail herein, call device 110 may be located within a building, and dispatch system 100 may include at least one call device 110 for each floor of the building. Call device 110 may be configured to transmit a message from one or more devices of dispatch system 100 (e.g., dispatch controller 130) identifying an elevator car assigned to arrive at the floor of the building to answer the call request. The message may be communicated by call device 110 via various suitable formats, including, for example, in a written form, an audible form, a graphic form, and more.

Input device 120 may be positioned inside the transportation unit and configured to receive a user input from one or more occupants of the transportation unit. For example, the user input may be indicative of a command requesting redirection of the transportation unit. Input device 120 may be configured to transmit the command to one or more devices of dispatch system 100, such as, for example, dispatch controller 130. Input device 120 may include a keypad, a touchscreen display, a microphone, a button, a switch, etc. As described in detail herein, input device 120 may be located within an elevator car, and dispatch system 100 may include at least one input device 120 for each elevator car in a building. In other embodiments, input device 120 may be omitted entirely from dispatch system 100.

Still referring to FIG. 1, counter device 125 may be positioned inside the transportation unit and configured to detect and transmit occupant data of the transportation unit to one or more devices of dispatch system 100, such as, for example, dispatch controller 130. For example, counter device 125 may measure and record a number of objects located within the transportation unit, including, but not limited to, an occupant, a personal belonging, a luggage, a baggage, and more. Counter device 125 may include an optical system facing an interior of the transportation unit, such as, for example, a sensor, a camera, a light beam, an infrared detector, etc. As described in further detail herein, counter device 125 may be coupled to an elevator car that is located within a building, and dispatch system 100 may include at least one counter device 125 for each elevator car of the building.

Dispatch controller 130 may be positioned outside the transportation unit and configured to receive data (e.g., motion data, a call request, a redirection command, occupant data, etc.) from one or more devices of dispatch system 100. Dispatch controller 130 may be further configured to determine at least one transportation unit of a plurality of transportation units to dispatch in response to a call request received from a prospective passenger seeking transportation. Dispatch controller 130 may include a computing device (see FIG. 4) operable to perform one or more processes (see FIG. 5) for dispatching at least one transportation unit with the smallest duration to pick up a prospective passenger. As described in further detail herein, dispatch controller 130 may be operably coupled to a plurality of elevator cars located within a building, and dispatch system 100 may include at least one dispatch controller 130 for each building.

Figure 2:
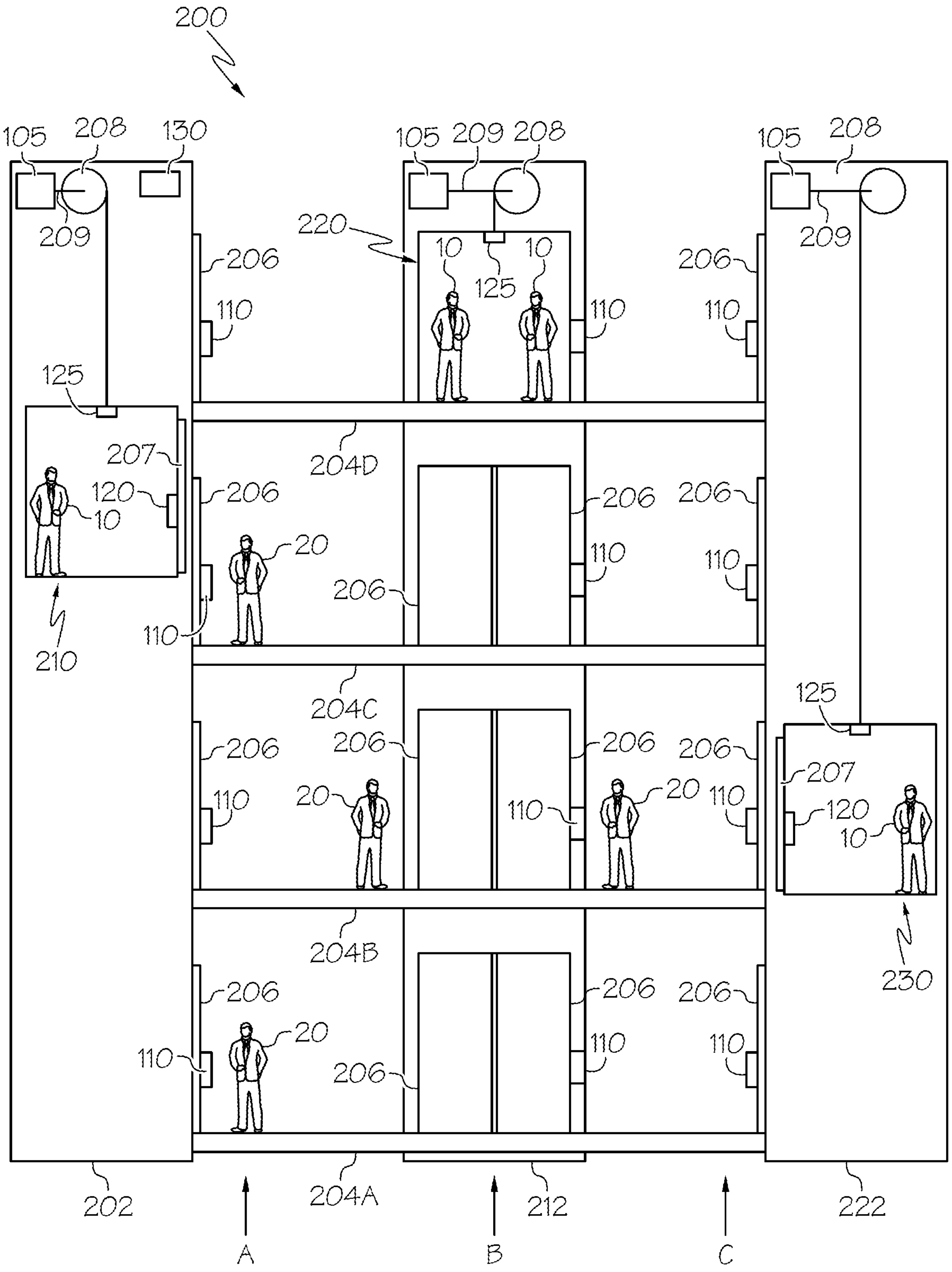
FIG. 2 is a schematic view of a working environment including multiple elevator cars at different locations interacting with the dispatch system shown in FIG. 1.

Referring now to FIG. 2, dispatch system 100 may be utilized in a working environment 200, such as a building (e.g., a facility, a factory, a store, a school, a house, an office, and various other structures). In the example, the transportation unit may include one or more elevator cars within the building. It should be appreciated that working environment 200 is merely illustrative such that dispatch system 100 may be utilized in various other suitable environments than those shown and described herein without departing from a scope of this disclosure. In the example, working environment 200 may include a plurality of floors defining a plurality of locations within the building, such as first floor 204A, second floor 204B, third floor 204C, and fourth floor 204D. It should be appreciated that, in other embodiments, the building of working environment 200 may include additional and/or fewer floors.

Working environment 200 may further include one or more elevator shafts with at least one elevator car positioned within each elevator shaft. In the example, working environment 200 includes a first elevator shaft 202 with at least one first elevator car 210, a second elevator shaft 212 with at least one second elevator car 220, and a third elevator shaft 222 with at least one third elevator car 230. Each elevator shaft 202, 212, 222 may be located at a different location on each of the plurality of floors 204A-204D. Stated differently, first elevator shaft 202 may be located at a first location "A," second elevator shaft 212 may be located at second location "B" that is different than the first location "A," and third elevator shaft 222 may be located at a third location "C" that is different than the first location "A" and second location "B," on each of the plurality of floors 204A-204D. Although not shown, it should be appreciated that working environment 200 may include additional (e.g., a plurality) elevator shafts, elevator cars, and locations at which said elevator shafts and elevator cars are located. Accordingly, it should be appreciated that working environment 200 may include a plurality of first elevator shafts 202 including a plurality of first elevator cars 210; a plurality of second elevator shafts 212 including a plurality of second elevator cars 220; a plurality of third elevator shafts 222 including a plurality of third elevator cars 230; and more.

Each elevator car 210, 220, 230 may be coupled to a pulley system 208 configured to move elevator cars 210, 220, 230 within elevator shafts 202, 212, 222 and relative to floors 204A-204D. It should be understood that pulley system 208 may include various mechanical and/or electrical mechanisms for moving elevator cars 210, 220, 230 within elevator shafts 202, 212, 222, including but not limited to, a motor, a cable, a counterweight, a sheave, etc.

Still referring to FIG. 2, each elevator car 210, 220 may include at least one motion controller 105 operably coupled to pulley system 208, such as, for example, via a wireless connection and/or a wired connection 209. Motion controller 105 may be configured to measure motion data from elevator cars 210, 220 by detecting a relative movement of pulley system 208. Each elevator car 210, 220 may further include at least one input device 120 positioned within a cabin of elevator car 210, 220 for receiving a user input from one or more occupants 10 located within the cabin.

Each floor 204A-204D may include one or more call devices 110 and access doors 206 at a location of each elevator shaft 202, 212, 222 on said floor 204A-204D. Access doors 206 may provide accessibility to elevator cars 210, 220, 230 when an elevator door 207 of elevator car 210, 220, 230 is aligned with the respective floor 204A-204D. Call device 110 may be configured to receive a user input from one or more prospective occupants 20 located at one of the plurality of locations on one of floors 204A-204D. For example, call device 110 may be configured to receive a user input indicative of a call requesting transportation via at least one of elevator cars 210, 220, 230. Call device 110 may be configured to transmit the call request to dispatch controller 130, which may include data indicative of a current location within working environment 200 from which the call request originated from (e.g., the first location "A" on first floor 204A). The call request may further include data indicative of a destination location within working environment 200 to which the prospective passenger is seeking transportation to (e.g., fourth floor 204D).

Still referring to FIG. 2, each elevator car 210, 220, 230 may further include at least one counter device 125 positioned within a cabin. Counter device 125 may be positioned along an inner wall (e.g., a ceiling) of each elevator car 210, 220, 230 and configured to detect a number of occupants 10 within the cabin. In some embodiments, counter device 125 may be operable to distinguish between one or more objects detected within elevator cars 210, 220, 230.

Figure 3:
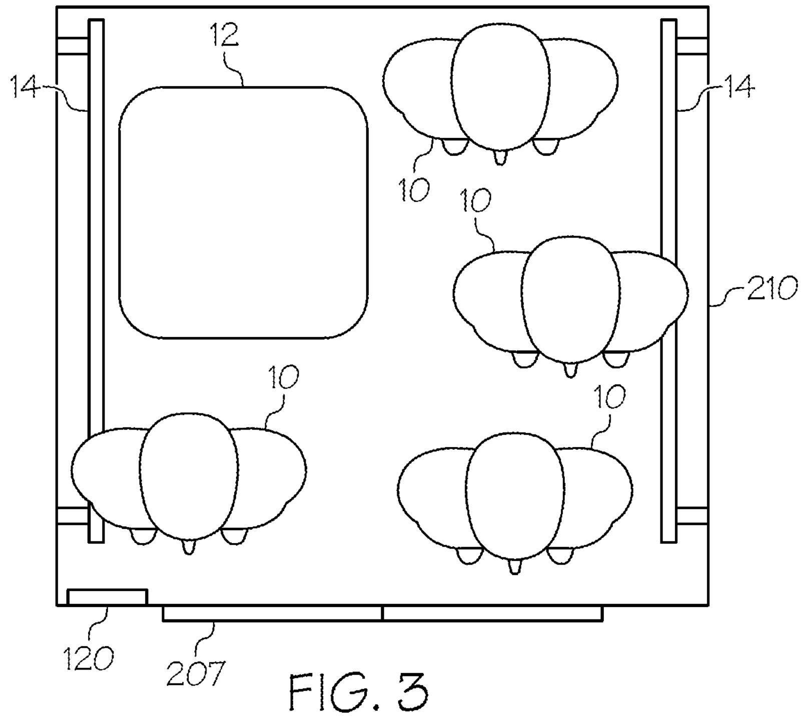
FIG. 3 is a top view of an interior of an elevator car from the working environment shown in FIG. 2.

For example, as seen in FIG. 3, counter device 125 may be configured to detect items present within the cabin and occupying a capacity of elevator cars 210, 220, 230 (e.g., occupants 10, ancillary objects 12, etc.) and items within the cabin that may not occupy a capacity of elevator cars 210, 220, 230 (e.g., rails 14, etc.). Counter device 125 may measure a number of items detected within elevator cars 210, 220, 230 and record such measurements as occupant data. As discussed further herein, counter device 125 may be configured to transmit occupant data (e.g., occupant data 144) for each elevator car 210, 220, 230 to dispatch controller 130 via network 115.

Figure 4:
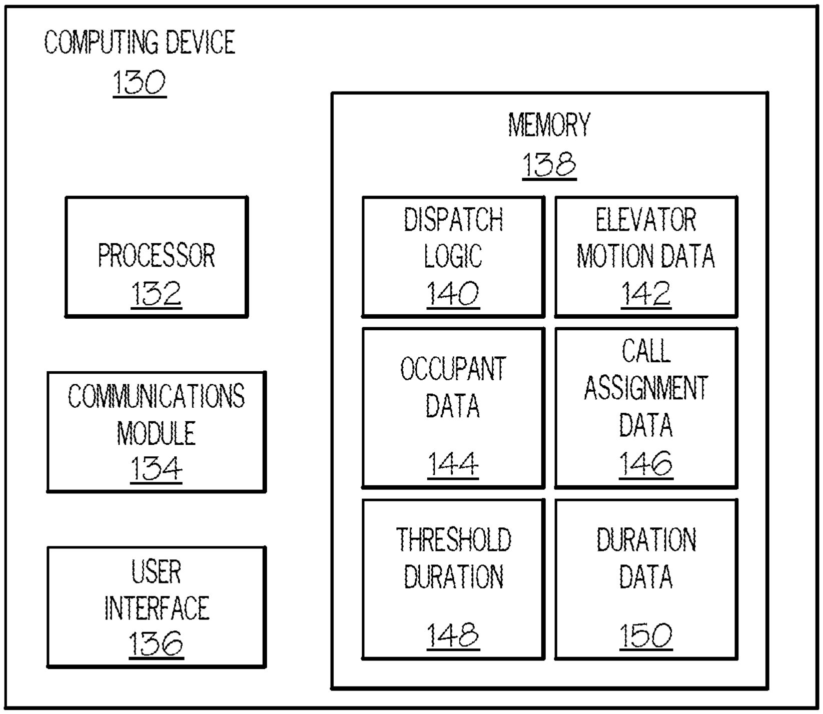
FIG. 4 is a schematic view of hardware components of a computing device from the dispatch system shown in FIG. 1.
Figure 5:
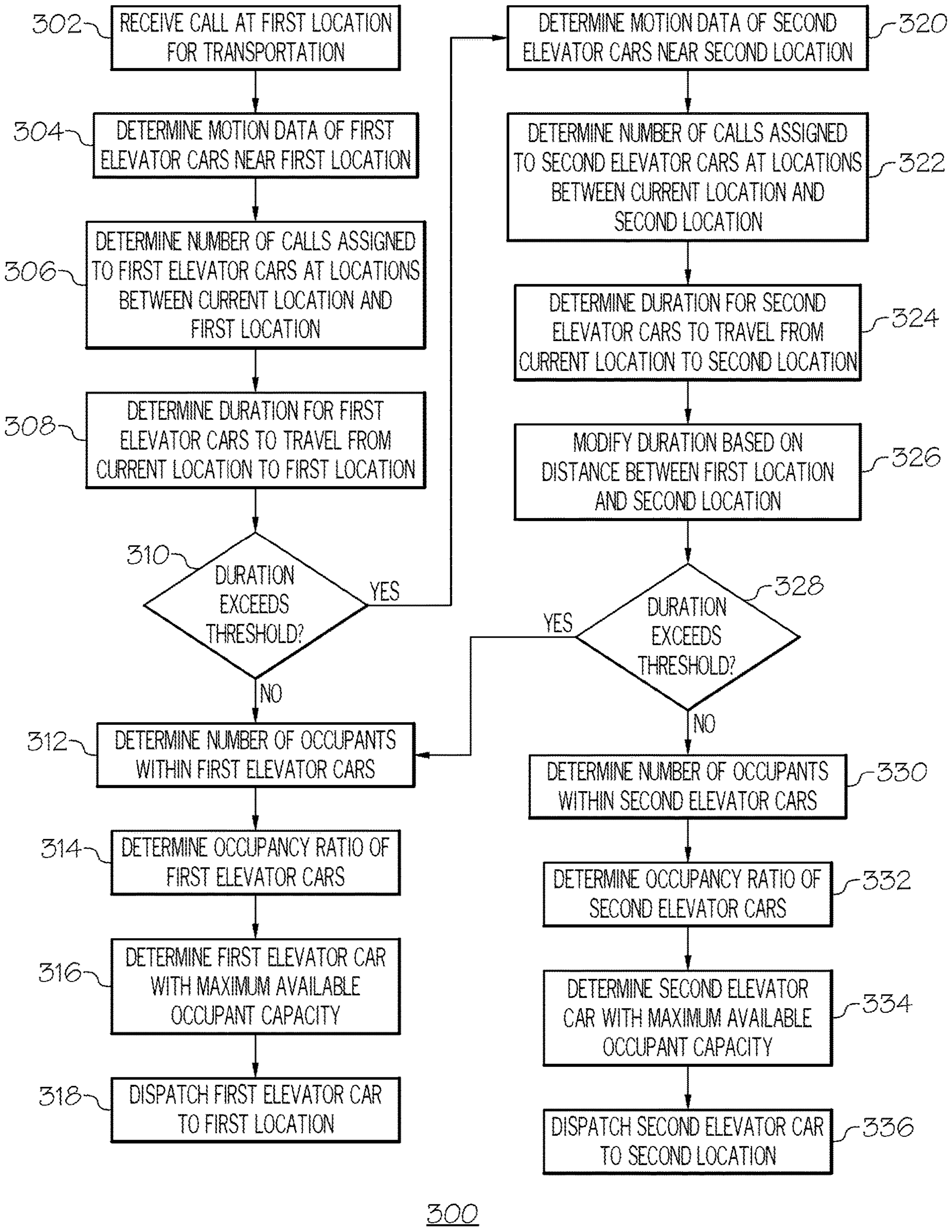
FIG. 5 is a flow diagram of an exemplary method of dispatching elevator cars with the dispatch system shown in FIG. 1.

Referring now to FIG. 4, dispatch controller 130 may include a computing device incorporating a plurality of hardware components that allow dispatch controller 130 to receive data (e.g., motion data, call requests, commands, occupant data, etc.), process information (e.g., occupant capacity), and/or execute one or more processes (see FIG. 5). Illustrative hardware components of dispatch controller 130 may include at least one processor 132, at least one communications module 134, a user interface 136, and at least one memory 138. In some embodiments, dispatch controller 130 may include a computer, a mobile user device, a remote station, a server, a cloud storage, and the like. In the illustrated embodiment, dispatch controller 130 is shown and described herein as a separate device from the other devices of dispatch system 100, while in other embodiments, one or more aspects of dispatch controller 130 may be integrated with one or more of the other devices of dispatch system 100. Stated differently, the illustrative hardware components of dispatch controller 130 shown and described herein may be integral with one or more of motion controller 105, call device 110, input device 120, and/or counter device 125.

Processor 132 may include any computing device capable of executing machine-readable instructions, which may be stored on a non-transitory computer-readable medium, such as, for example, memory 138. By way of example, processor 132 may include a controller, an integrated circuit, a microchip, a computer, and/or any other computer processing unit operable to perform calculations and logic operations required to execute a program. As described in detail herein, processor 132 is configured to perform one or more operations in accordance with the instructions stored on memory 138, such as, for example, dispatch logic 140.

Communications module 134 may facilitate communication between dispatch controller 130 and the one or more other devices of dispatch system 100, such as, for example, via network 115. User interface 136 may include one or more input and output devices, including one or more input ports and one or more output ports. User interface 136 may include, for example, a keyboard, a mouse, a touchscreen, etc., as input ports. User interface 136 may further include, for example, a monitor, a display, a printer, etc. as output ports. User interface 136 may be configured to receive a user input indicative of various commands, including, but not limited to, a command defining and/or adjusting the threshold duration 148 stored in memory 138, and more.

Still referring to FIG. 4, memory 138 may include various programming algorithms and data that support an operation of dispatch system 100. Memory 138 may include any type of computer readable medium suitable for storing data and algorithms, such as, for example, random access memory (RAM), read only memory (ROM), a flash memory, a hard drive, and/or any device capable of storing machine-readable instructions. Memory 138 may include one or more data sets, including, but not limited to, motion data 142 received from motion controller 105, occupant data 144 captured from counter device 125, call assignment data 146 and duration data 150 for each of the plurality of elevator cars 210, 220, 230, and the like. Memory 138 may further include a threshold duration 148 that may be preprogrammed and/or adjustable by a user of dispatch system 100, such as, for example, via user interface 136.

As described further herein, occupant data 144 may include a real-time number of occupants 10 detected within a cabin of each elevator car 210, 220, 230 by counter device 125. Call assignment data 146 may include a call request received from a prospective occupant 20 at one of the plurality of floors 204A-204D, for transportation by at least of the plurality of elevator cars 210, 220, 230. Dispatch controller 130 may be configured to store the occupant data 144 in memory 138 and associate the number of occupants 10 with a corresponding elevator car 210, 220, 230. Dispatch controller 130 may be further configured to store the call assignment data 146 in memory 138 to determine a current number of stops assigned to each elevator car 210, 220, 230. As described further herein, dispatch controller 130 may be configured to determine a minimum travel duration for each of the plurality of elevator cars 210, 220, 230 based on at least one or more of the motion data 142, the occupant data 144, and the call assignment data 146.

Further, memory 138 may include a non-transitory computer readable medium that stores machine-readable instructions thereon, such as, dispatch logic 140. In one example, dispatch logic 140 may include executable instructions that allow dispatch system 100 to determine which elevator car from the plurality of elevator cars 210, 220, 230 to dispatch in response to receiving a call request at the first location "A" for transportation to a destination location. Dispatch logic 140 may facilitate determining an occupant capacity of each elevator car 210, 220, 230 based on a number of occupants physically present within each elevator car 210, 220, 230. Dispatch logic 140 may further facilitate the determination of a minimum duration (e.g., duration data 150) for each of the plurality of elevator cars 210, 220, 230 to travel to a location based on one or more of the motion data 142, occupant data 144, and/or call assignment data 146. As described in further detail herein, dispatch system 100 may be configured to determine at least one elevator car 210, 220, 230 having the least duration (e.g., duration data 150) to travel to a first location in response to a call request from a prospective occupant 20.

Referring now to FIG. 5, an example method 300 of using dispatch system 100 to determine a travel duration of a plurality of elevator cars and to dispatch an elevator car having the shortest travel duration is depicted. It should be understood that the steps shown and described herein, and the sequence in which they are presented, are merely illustrative such that additional and/or fewer steps may be included in various arrangements without departing from a scope of this disclosure.

At step 302, dispatch system 100 may receive a call request at the first location "A" of a plurality of locations within working environment 200. The call request may be initiated in response to a prospective occupant 20 actuating call device 110 at the first location "A," such as, for example, on first floor 204A and adjacent to a plurality of first elevator shafts 202. Call device 110 may transmit the call request to dispatch controller 130 via network 115, and the call request may include data indicative of the first location "A" from which the call request originated. The call request may further include data indicative of a destination location (e.g., fourth floor 204D) within working environment 200 to which the prospective occupant 20 seeks to travel.

At step 304, with the call request originating from first floor 204A and adjacent to the plurality of first elevator shafts 202, dispatch controller 130 may retrieve motion data 142 from a corresponding motion controller 105 of a plurality of first elevator cars 210 located within the plurality of first elevator shafts 202. Dispatch controller 130 may be configured to determine various movement parameters of the plurality of first elevator cars 210 from the motion data 142, such as, for example, a current location of each first elevator car 210 relative to a respective first elevator shaft 202, a current travel direction of each first elevator car 210, and a current travel speed of each first elevator car 210.

It should be understood that, in response to determining one or more first elevator cars 210 are not traveling toward the first location "A," dispatch controller 130 may be configured to disregard the particular first elevator car 210 from further consideration. Stated differently, dispatch controller 130 may determine that any elevator car traveling in a different direction than toward the first location "A" (relative to the current location of the elevator car) may not be an optimal elevator car to answer the call request. In the example, working environment 200 includes first elevator car 210 positioned between fourth floor 204D and third floor 204C, and moving toward first floor 204A.

In some embodiments, dispatch controller 130 may be further configured to determine whether a current location of the plurality of first elevator cars 210 is located prior to the first location "A," or whether first elevator cars 210 have moved beyond the first location "A." Stated differently, dispatch controller 130 may determine that any elevator car that is currently positioned beyond the first location "A" may not be an optimal elevator car to answer the call request. In response to determining one or more of the plurality of first elevator cars 210 are not located before the first location "A," dispatch controller 130 may be configured to disregard said first elevator cars 210 from further consideration. In the example, as seen in FIG. 2, first elevator car 210 is positioned between fourth floor 204D and third floor 204C, such that dispatch controller 130 may determine that first elevator car 210 is currently located before first floor 204A (e.g., the first location "A").

Still referring to FIG. 5, at step 306, dispatch controller 130 may be configured to determine a number of calls assigned to each of the plurality of first elevator cars 210 (e.g., by dispatch controller 130) and that have a (pick up) location positioned between a current location of each first elevator car 210 and the first location "A." Stated differently, dispatch controller 130 may determine how many, if any, intermediate stops each first elevator car 210 is expected to have between its current location and the first location "A" (e.g., first floor 204A). It should be understood that the number of calls previously assigned to each first elevator car 210 is relative to when the call request (step 302) is received by dispatch controller 130.

It should further be appreciated that any calls previously assigned to first elevator cars 210, and which do not include a location positioned between the current location and the first location "A," do not form an intermediate stop. Accordingly, dispatch controller 130 may be configured to disregard any prior calls assigned to first elevator cars 210, and which have a (pick up) location after the first location "A," when determining the number of calls at step 306. In the example, as seen in FIG. 2, first elevator car 210 may include a previously-assigned call at third floor 204C such that dispatch controller 130 may determine that first elevator car 210 includes one stop between the current location of first elevator car 210 and first floor 204A (e.g., the first location "A").

Still referring to FIG. 5, at step 308, dispatch controller 130 may be configured to analyze the motion data 142 (step 304) and the call assignment data 146 (step 306) collected for the plurality of first elevator cars 210 to determine a minimum duration (e.g., a first duration) for each first elevator car 210 to travel from a respective current location to the first location "A." For example, dispatch controller 130 may analyze a travel distance between a current location of each first elevator car 210 and the first location "A" when determining the minimum duration. Dispatch controller 130 may further analyze a travel speed of each first elevator car 210 when determining the minimum duration.

By further example, dispatch controller 130 may determine that the minimum duration required for each first elevator car 210 to travel to the first location "A" increases based on the number of existing calls assigned to the first elevator car 210. Stated differently, dispatch controller 130 may assess the number of stops assigned to each first elevator car 210, and positioned between a current location and the first location "A," when determining the minimum duration for each first elevator car 210. For example, dispatch controller 130 may compute a predefined increment (e.g., duration data 150) to the minimum duration for each stop assigned to a particular first elevator car 210. The predefined increment may be programmed in memory 138, and may include various suitable values ranging from about 1 second to about 120 seconds, and particularly about 60 seconds. In some embodiments, a value of the predefined increment may be selectively modified by a user of dispatch system 100, such as via user interface 136.

At step 310, dispatch controller 130 may be configured to compare the minimum duration of the plurality of first elevator cars 210 to the threshold duration 148. As described in detail above, the threshold duration 148 may define a maximum allotted duration for an elevator car to travel from a respective current location to the first location "A." In other words, elevator cars determined to have a minimum duration that exceeds the threshold duration 148 may not be an optimal elevator car to answer the call request. In response to determining two or more of the plurality of first elevator cars 210 have a minimum duration that is less than the threshold duration 148 at step 310, dispatch controller 130 may be configured to determine a number of occupants 10 located within each of the two or more first elevator cars 210 at step 312.

For example, dispatch controller 130 may be configured to determine the number of occupants 10 within each first elevator car 210 (having a minimum duration less than the threshold duration 148) by retrieving occupant data 144 from a respective counter device 125 of each first elevator car 210. In some embodiments, counter device 125 may be configured to detect a total number of occupants 10 and/or objects 12 located within first elevator cars 210 (see FIG. 3). Thus, dispatch controller 130 may consider one or more objects 12 detected by counter device 125 when determining the number of occupants 10 at step 312. Each counter device 125 may transmit a signal to dispatch controller 130 via network 115 indicative of the occupant data 144 for the respective first elevator car 210.

Still referring to FIG. 5, at step 314, dispatch controller 130 may be configured to determine an occupancy ratio of each of the plurality of first elevator cars 210 based on at least the number of occupants 10 within the elevator car (step 312) and a maximum occupant capacity of each elevator car. In some embodiments, a maximum occupant capacity of the plurality of first elevator cars 210 may be communicated to dispatch controller 130 from counter device 125 via network 115. In other embodiments, dispatch controller 130 may store the maximum occupant capacity in memory 138 for each of the plurality of first elevator cars 210. It should be appreciated that a size and/or shape of the cabin of each of the plurality of first elevator cars 210 may be determinative of a maximum occupant capacity.

In the example, the plurality of first elevator cars 210 may include a substantially similar size and/or shape such that the maximum occupant capacities of each are relatively similar. In other examples, the plurality of first elevator cars 210 may include varying sizes and/or shapes, such that the maximum occupant capacity of each may differ relative to one another. In the example, first elevator car 210 may include a total occupancy of one occupant and a maximum occupant capacity of six occupants. Dispatch controller 130 may be configured to determine first elevator car 210 includes an occupancy ratio of approximately 1:6 (e.g., approximately 16.67%).

Still referring to FIG. 5, at step 316, dispatch controller 130 may be configured to determine at least one of the plurality of first elevator cars 210 having a maximum occupant capacity that is greater than the remaining plurality of first elevator cars 210. Dispatch controller 130 may compare the occupancy ratios of each of the plurality of first elevator cars 210 to determine at least one first elevator car 210 having the maximum available occupant capacity. Dispatch controller 130 may assign the call request received at step 302 to the first elevator car 210 of the plurality of first elevator cars 210 (having a travel duration that is less than the threshold duration 148) that includes the maximum available occupant capacity. At step 318, dispatch controller may be configured to dispatch the at least one first elevator car 210 to the first location "A."

In instances where two or more first elevator cars 210 include a similar occupancy ratio relative to one another, dispatch controller 130 may be configured to compare the minimum duration of each to one another to determine an optimal first elevator car 210 to dispatch. For example, dispatch controller 130 may assign the call request to the first elevator car 210 having the smallest minimum duration to travel to the first location "A." In other embodiments, dispatch controller 130 may compare the minimum durations of the plurality of first elevator cars 210 to one another even when the occupancy ratios of first elevator cars 210 vary relative to one another. In this instance, dispatch controller 130 may be configured to dispatch at least one first elevator car 210 having the shortest minimum duration despite another one of the plurality of first elevator cars 210 having a greater maximum available occupant capacity.

It should be appreciated that, in instances where dispatch controller 130 determines only one first elevator car 210 has a minimum duration that is less than the threshold duration 148 (at step 310), dispatch controller 130 may forgo performance of steps 312 to 316. In this instance, the first elevator car 210 identified at step 310 may be dispatched to the first location "A" at step 318. In other embodiments, method 300 may omit steps 312 to 316 entirely such that dispatch controller 130 may be configured to dispatch the at least one first elevator car 210 having the shortest minimum duration, at step 318.

Dispatch controller 130 may be configured to communicate with call device 110 to transmit a message to the prospective occupant 20 at the first location "A" (e.g., first floor 204A). For example, dispatch controller 130 may communicate an identification of the first elevator car 210 dispatched to the first location "A." In other embodiments, dispatch controller 130 may identify the first elevator shaft 202 of the plurality of first elevator shafts 202 from which the first elevator car 210 may arrive from. The message may be transmitted via call device 110 in various suitable formats, including, for example, via a display (e.g., a written form, a graphic form, etc.), a speaker (e.g., an audible form), and more.

Returning to step 310, in response to determining each of the plurality of first elevator cars 210 has a travel duration that exceeds the threshold duration 148, dispatch controller 130 may be configured to disregard the plurality of first elevator cars 210 from further consideration. At step 320, dispatch controller 130 may retrieve motion data 142 from a corresponding motion controller 105 of the plurality of elevator cars 220, 230 located at various locations in working environment 200 other than the first location "A." That is, dispatch controller 130 may consider the plurality of second elevator cars 220 (e.g., located adjacent to the second location "B") and third elevator cars 230 (e.g., located adjacent to the third location "C") upon determining that none of the plurality of first elevator cars 210 includes a travel duration that is less than the threshold duration 148.

Dispatch controller 130 may consider the plurality of elevator cars 220, 230 despite second elevator cars 220 and third elevator cars 230 being located further from the first location "A" (e.g., a location within working environment 200 proximate to where the call request originated from) than first elevator cars 210. Dispatch controller 130 may be configured to determine various movement parameters of the plurality of second elevator cars 220 from the motion data 142, such as, for example, a current location of each second elevator car 220 relative to a respective second elevator shaft 212, a current travel direction of each second elevator car 220, a current travel speed of each second elevator car 220, and more. Dispatch controller 130 may further determine similar movement parameters of the plurality of third elevator cars 230.

In response to determining one or more second or third elevator cars 220, 230 are not traveling toward the first floor 204A, dispatch controller 130 may be configured to disregard the particular elevator cars 220, 230 from further consideration. Dispatch controller 130 may be further configured to determine whether a current location of the plurality of second and third elevator cars 220, 230 are located prior to first floor 204A. In the example, working environment 200 includes second elevator car 220 stationary at fourth floor 204D, and third elevator car 230 stationary at second floor 204B, such that dispatch controller 130 may determine that second elevator car 220 and third elevator car 230 are located before first floor 204A.

Still referring to FIG. 5, at step 322, dispatch controller 130 may be configured to determine how many, if any, intermediate stops second elevator cars 220 are expected to have between a respective current location and the second location "B" (e.g., on first floor 204A). Dispatch controller 130 may similarly determine the number of calls assigned to third elevator cars 230, and that have a (pick up) location positioned between a respective current location of each third elevator car 230 and the third location "C" (e.g., on first floor 204A). In the example, second elevator car 220 may include an assigned call at second floor 204B, and third elevator car 230 may not include any assigned calls. Accordingly, dispatch controller 130 may determine that second elevator car 220 includes one stop between the current location of second elevator car 220 and the second location "B."

At step 324, dispatch controller 130 may be configured to analyze the motion data 142 (step 322) and the call assignment data 146 (step 324) of the plurality of elevator cars 220, 230 to determine a minimum duration for each elevator car 220, 230 to travel from a respective current location to the second and/or third location "B, C." For example, dispatch controller 130 may analyze a travel distance between a respective current location of each elevator car 220, 230 and the corresponding second and/or third location "B, C" when determining the minimum duration. Dispatch controller 130 may further analyze a travel speed of each elevator car 220, 230 when determining the minimum duration. By further example, dispatch controller 130 may determine an additional duration required to travel to the respective location "B, C," when elevator car 220, 230 includes a preexisting call assignment. Dispatch controller 130 may assess the number of stops assigned to each elevator car 220, 230 when determining the minimum duration for each elevator car 220, 230.

Still referring to FIG. 5, at step 326, dispatch controller 130 may be further configured to modify the minimum duration computation for elevator cars 220, 230 based on a distance the prospective occupant 20 may be required to travel (e.g., walk) from the first location "A" to each of the second location "B" and third location "C." Dispatch controller 130 may include data (e.g., duration data 150) indicative of the time required to travel from the first location "A," at which the call request originated from, to the second location "B" at which second elevator cars 220 are positioned, based on the distance between the first location "A" and the second location "B." Dispatch controller 130 may be configured to consider the distance required for the prospective occupant 20 to travel between locations "A, B" when determining the minimum duration (e.g., a second duration) for each of the plurality of second elevator cars 220.

Dispatch controller 130 may further include data indicative of the time required for prospective passengers 20 to travel between the first location "A" and the third location "C," at which third elevator cars 230 are positioned, based on the distance between the first location "A" and the third location "C." Dispatch controller 130 may be configured to consider the distance required for the prospective occupant 20 to travel between locations "A, C" when determining the minimum duration (e.g., a third duration) for each of the plurality of third elevator cars 230.

Accordingly, dispatch controller 130 may be configured to modify (e.g., increase) the minimum duration of the plurality of elevator cars 220, 230 based on the distance between first location "A" and the respective second location "B" or third location "C" when determining the minimum duration for elevator cars 220, 230. In other embodiments, dispatch controller 130 may be configured to compute the distance between the first location "A" and at least one of the second location "B" or the third location "C".

At step 328, dispatch controller 130 may be configured to compare the minimum duration of the plurality of elevator cars 220, 230 to the threshold duration 148. In response to determining two or more of the plurality of elevator cars 220, 230 have a minimum duration that is less than the threshold duration 148 at step 328, dispatch controller 130 may be configured to determine the number of occupants 10 within each of the two or more elevator cars 220, 230 at step 330. For example, dispatch controller 130 may be configured to determine the number of occupants 10 within each elevator car 220, 230 (having a minimum duration less than the threshold duration 148) by retrieving occupant data 144 from the respective counter device 125 of each elevator car 220, 230.

Still referring to FIG. 5, at step 332, dispatch controller 130 may be configured to determine an occupancy ratio of each of the plurality of elevator cars 220, 230 based on at least the number of occupants 10 detected within the elevator car (step 330) and a maximum occupant capacity of each elevator car. In the example, second elevator car 220 may include a total occupancy of two occupants and a maximum occupant capacity of six occupants, and third elevator car 230 may include a total occupancy of one occupant and a maximum occupant capacity of five occupants. Dispatch controller 130 may be configured to determine second elevator car 220 includes an occupancy ratio of 2:6 (e.g., approximately 33.33%), and third elevator car 230 includes an occupancy ratio of 1:5 (e.g., approximately 20%).

At step 334, dispatch controller 130 may be configured to determine at least one of the plurality of elevator cars 220, 230 having a maximum occupant capacity that is greater than the remaining elevator cars 220, 230. Dispatch controller 130 may compare the occupancy ratios of each of the plurality of elevator cars 220, 230 to determine at least one second elevator car 220 or third elevator car 230 having the maximum available occupant capacity. Dispatch controller 130 may assign the call request received at step 302 to the elevator car 220, 230 (having a travel duration that is less than the threshold duration 148) that includes the maximum available occupant capacity. At step 336, dispatch controller 130 may dispatch the elevator car 220, 230 having the maximum available occupant capacity to the corresponding location "B, C" on first floor 204A.

In instances where two or more second elevator cars 220 and/or third elevator cars 230 include a similar occupancy ratio relative to one another, dispatch controller 130 may compare the minimum duration of each to determine an optimal elevator car 220, 230 to dispatch. For example, dispatch controller 130 may dispatch the second elevator car 220 having the smallest minimum duration for traveling to the second location "B," or the third elevator car 230 having the smallest minimum duration for traveling to the third location "C." In other embodiments, dispatch controller 130 may compare the minimum durations of the plurality of elevator cars 220, 230 to one another even when the occupancy ratios of elevator cars 220, 230 vary relative to one another. In this instance, dispatch controller 130 may be configured to dispatch at least one elevator car 220, 230 having the shortest minimum duration despite another one of the plurality of elevator cars 220, 230 having a greater maximum available occupant capacity.

It should be appreciated that, in instances where dispatch controller 130 determines only one second elevator car 220 or third elevator car 230 has a minimum duration that is less than the threshold duration 148 (at step 328), dispatch controller 130 may forgo performance of steps 330 to 334. In this instance, the elevator car 220, 230 identified at step 328 may be dispatched at step 336. In other embodiments, method 300 may omit steps 330 to 334 entirely such that dispatch controller 130 may be configured to dispatch the at least second elevator car 220 or third elevator car 230 having the shortest minimum duration, at step 336.

Returning to step 328, in response to determining each of the plurality of second elevator cars 220 and third elevator cars 230 have a travel duration that exceeds the threshold duration 148, dispatch controller 130 may be configured to disregard the plurality of second elevator cars 220 and third elevator cards 230 from further consideration. In this instance, dispatch controller 130 may assign the call request received at step 302 to one of the plurality of first elevator cars 210, despite each of the first elevator cars 210 having a minimum duration that exceeds the threshold duration 148. In this instance, dispatch controller 130 may determine the number of occupants present (step 312), the occupancy ratio (step 314), and the maximum available occupancy ratio (step 316) of each of the plurality of first elevator cars 210. At step 318, dispatch controller 130 may dispatch the first elevator car 210 of the plurality of first elevator cars 210 having the maximum available occupancy. Alternatively, dispatch controller 130 may omit steps 312 to 316, and dispatch the at least one first elevator car 210 having the shortest minimum duration, at step 318.

All technical and scientific terms used herein have the same meaning as commonly understood to one of ordinary skill in the art to which this disclosure belongs unless clearly indicated otherwise. As used herein, the singular forms "a", "an", and "the" include plural references unless the context clearly dictates otherwise.

The above description is illustrative and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description.

What is claimed is:

1. A method for dispatching an elevator car, the method comprising:

determining a first duration for (i) an occupant to travel from a first location where the elevator car is requested by the occupant to a second location, and (ii) a first elevator car to travel from a current location of the first elevator car to the second location;

determining a second duration for (i) the occupant to travel from the first location where the elevator car is requested by the occupant to a third location that is different than the second location, and (ii) a second elevator car to travel from a current location of the second elevator car to the third location;

comparing the first duration to the second duration; and dispatching at least one of the first elevator car to the second location when the first duration is less than the second duration or the second elevator car to the third location when the second duration is less than the first duration.

2. The method of claim 1, further comprising a plurality of first elevator cars and a plurality of second elevator cars, the method further comprising:

dispatching at least one of the plurality of first elevator cars to the second location when the first duration of the at least one of the plurality of first elevator cars is less than the first duration of a remaining plurality of first elevator cars and the second duration of each of the plurality of second elevator cars; or dispatching at least one of the plurality of second elevator cars to the third location when the second duration of the at least one of the plurality of second elevator cars is less than the second duration of a remaining plurality of second elevator cars and the first duration of each of the plurality of first elevator cars.

3. The method of claim 1, wherein determining the first duration for the first elevator car to travel from the current location of the first elevator car to the second location comprises receiving motion data from the first elevator car; and wherein determining the second duration for the second elevator car to travel from the current location of the second elevator car to the third location comprises receiving motion data from the second elevator car.

4. The method of claim 3, further comprising:

determining at least one of a travel direction, a travel speed, a number of preassigned calls, and the current location for each of the first elevator car and the second elevator car based on the motion data;

wherein the number of preassigned calls of the first elevator car includes call requests from one or more locations by occupants positioned between the current location of the first elevator car and the second location, and the number of preassigned calls of the second elevator car includes call requests from one or more locations by occupants positioned between the current location of the second elevator car and the third location.

5. The method of claim 3, further comprising:

determining a first distance between the current location of the first elevator car and the second location, and a second distance between the current location of the second elevator car and the third location, based on the motion data; and dispatching the first elevator car when the first distance is less than the second distance, or the second elevator car when the second distance is less than the first distance.

6. The method of claim 1, wherein prior to dispatching the at least one of the first elevator car to the second location or the second elevator car to the third location, the method comprises:

comparing each of the first duration and the second duration to a threshold duration.

7. The method of claim 6, further comprising:

determining a first occupant capacity of the first elevator car when the first duration is less than the threshold duration; and determining a first ratio between a first number of occupants located within the first elevator car and the first occupant capacity.

8. The method of claim 7, further comprising:

determining a second occupant capacity of the second elevator car when the first duration is greater than the threshold duration and the second duration is less than the threshold duration; and determining a second ratio between a second number of occupants located within the second elevator car and the second occupant capacity.

9. The method of claim 8, further comprising:

comparing the first ratio of the first elevator car to the second ratio of the second elevator car; and determining the first ratio of the first elevator car is greater than the second ratio of the second elevator car.

10. The method of claim 9, wherein dispatching the at least one of the first elevator car to the second location or the second elevator car to the third location comprises:

dispatching the first elevator car in response to the first ratio being greater than the second ratio.

11. The method of claim 8, wherein each of the first elevator car and the second elevator car includes a counter device configured to generate data indicative of the first number of occupants located within the first elevator car and the second number of occupants located within the second elevator car.

12. The method of claim 6, wherein the threshold duration defines a first maximum allotted duration for the occupant to travel from the first location to the second location and the first elevator car to travel from the current location of the first elevator car to the second location.

13. The method of claim 12, wherein the threshold duration defines a second maximum allotted duration for the occupant to travel from the first location to the third location and the second elevator car to travel from the current location of the second elevator car to the third location.

14. The method of claim 1, wherein prior to determining the first duration or the second duration, the method comprises:

receiving a call for the elevator car from the occupant located at the first location.

15. The method of claim 1, the method comprises:

determining a third duration for a third elevator car to travel from a current location of the third elevator car to the first location of the occupant requesting the elevator car; and determining the first duration and the second duration when the third duration exceeds a threshold duration.

16. A system for dispatching an elevator car, comprising:

at least one motion controller operably coupled to a plurality of elevator cars, the at least one motion controller is configured to determine a current location of the plurality of elevator cars, wherein the plurality of elevator cars includes a first subset and a second subset; and a dispatch controller operably coupled to the at least one motion controller of the plurality of elevator cars, such that the dispatch controller receives data indicative of the current location of the plurality of elevator cars, wherein the dispatch controller is configured to:

determine a first duration for (i) an occupant to travel from a first location where the elevator car is requested by the occupant to a second location, and (ii) each of the first subset of the plurality of elevator cars to travel from a current location of each of the first subset of the plurality of elevator cars to the second location;

determine a second duration for (i) the occupant to travel from the first location where the elevator car is requested by the occupant to a third location, and (ii) each of the second subset of the plurality of elevator cars to travel from a current location of each of the second subset of the plurality of elevator cars to the third location; and compare the first duration to the second duration; and dispatch at least one of the plurality of elevator cars from the first subset when the first duration of the at least one the plurality of elevator cars from the first subset is less than the second duration of each of the plurality of elevator cars from the second subset.

17. The system of claim 16, wherein determining the first duration for the plurality of elevator cars in the first subset to travel from the current location of the plurality of elevator cars in the first subset to the second location comprises receiving motion data from the first subset; and wherein determining the second duration for the plurality of elevator cars in the second subset to travel from the current location of the plurality of elevator cars in the second subset to the third location comprises receiving motion data from the second subset.

18. The system of claim 17, wherein the dispatch controller is configured to:

determine one or more movement parameters for each of the first subset and the second subset of the plurality of elevator cars based on the motion data, wherein the one or more movement parameters include a travel direction of each of the plurality of elevator cars; and disregard one or more of the plurality of elevator cars in the first subset or the second subset based on the travel direction of the one or more of the plurality of elevator cars not being towards the second location or the third location.

19. The system of claim 17, wherein the dispatch controller is configured to:

determine one or more movement parameters for each of the first subset and the second subset of the plurality of elevator cars based on the motion data, wherein the one or more movement parameters include the current location of each of the plurality of elevator cars; and disregard one or more of the plurality of elevator cars in the first subset or the second subset based on the current location of the one or more of the plurality of elevator cars not being located prior to the second location or the third location.

20. A system for controlling traffic flow of a plurality of elevator cars, comprising:

a processor; and a memory storing instructions that, when executed by the processor, causes the processor to perform operations including:

determining a first duration for (i) an occupant to travel from a first location where the elevator car is requested by the occupant to a second location, and (ii) each of a first subset of the plurality of elevator cars to travel from a current location of each of the first subset of the plurality of elevator cars to the second location;

determining a second duration for (i) the occupant to travel from the first location where the elevator car is requested by the occupant to a third location, and (ii) each of the second subset of the plurality of elevator cars to travel from a current location of each of the second subset of the plurality of elevator cars to the third location; and comparing the first duration to the second duration; and dispatching at least one of the plurality of elevator cars from the first subset when the first duration of the at least one the plurality of elevator cars from the first subset is less than the second duration of each of the plurality of elevator cars from the second subset.

* * * * *